3 Sheets. Sheet 1.
C. Wheeler, Jr.
Mower.
No. 1971 Reissued May 23. 1865.
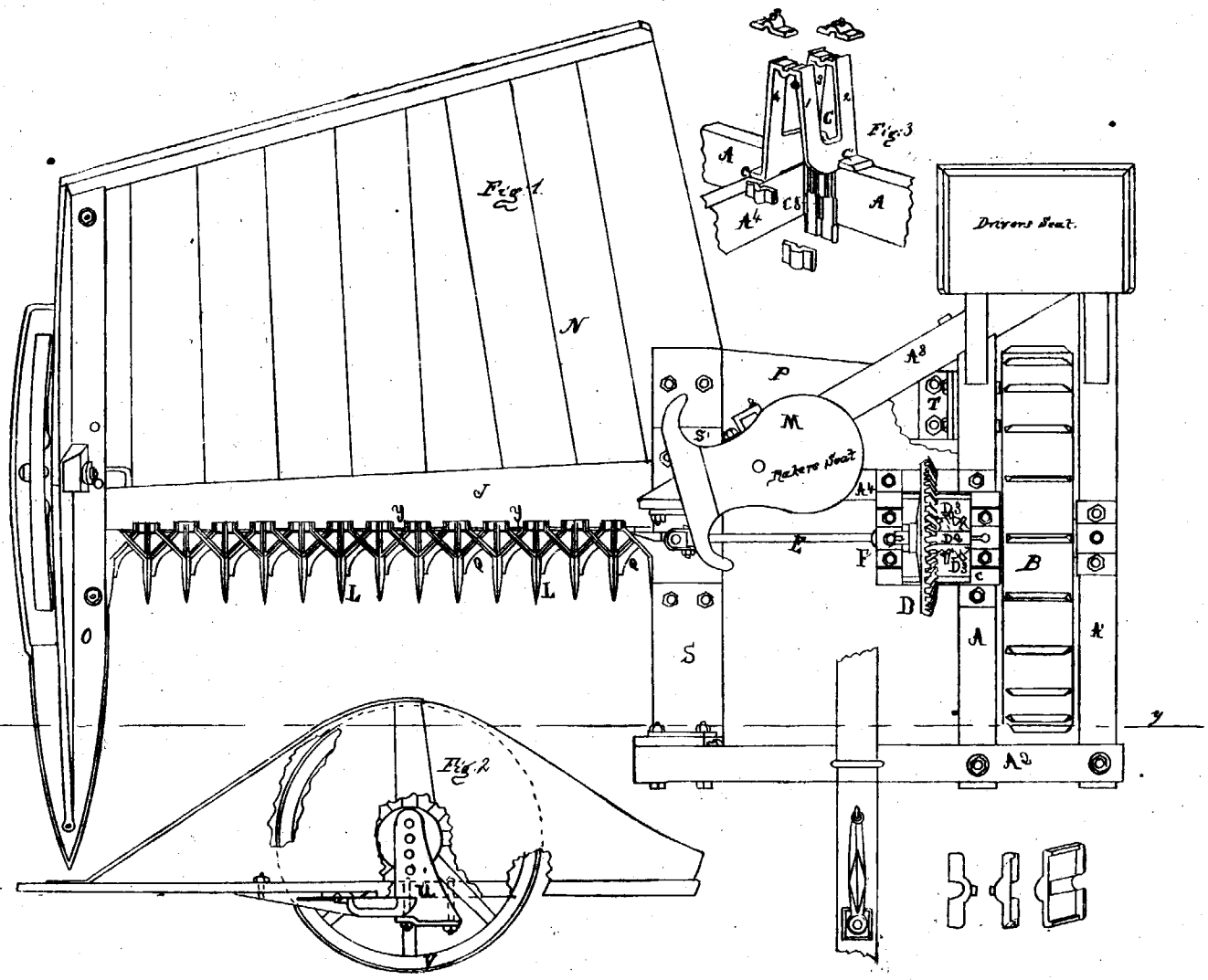
Witnesses James H. Gridley
Allen T. Langston
C. Wheeler Jr. By
E. B. Fortson Atty 3 Sheets. Sheet 2.
C. Wheeler, Jr.
Mower.
No. 1971 Reissued. May. 23. 1865.
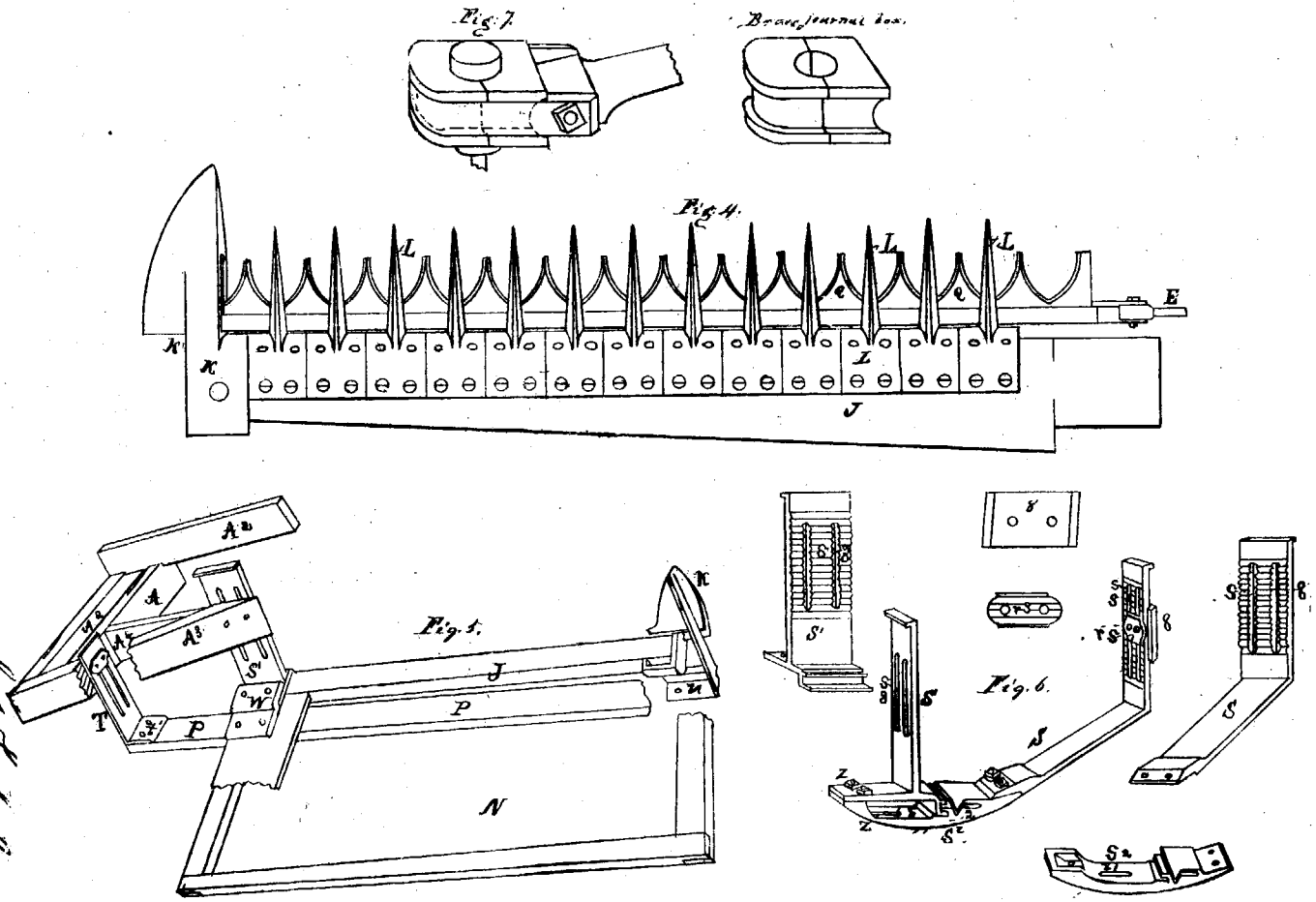
Witnesses
James H. Spicer
Allen J. Langston
C. Wheeler Jr
By E. B. Forbush
Atty 3 Sheets. Sheet 3.
C. Wheeler Jr.
Mower.
No. 1971. Reissued May. 23. 1865.
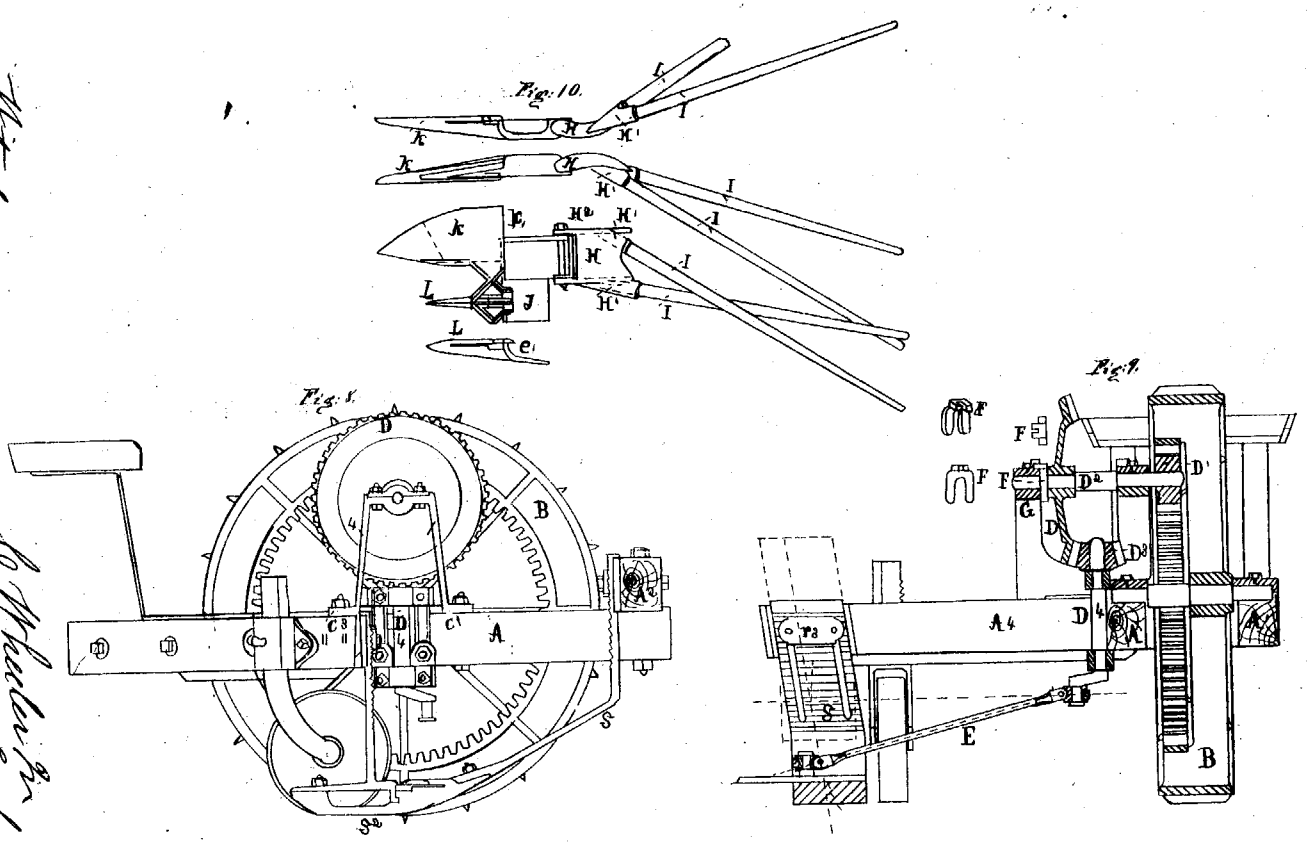
Witnesses
James H. Gridley
Allen F. Longstreet
C. Wheeler Jr.
By E. B. Forbush
Atty

UNITED STATES PATENT OFFICE.

CYRENUS WHEELER, JR., OF POPLAR RIDGE, ASSIGNEE, BY MESNE ASSIGNMENTS, OF E. B. FORBUSH, OF BUFFALO, NEW YORK.

IMPROVEMENT IN HARVESTERS.

Specification forming part of Letters Patent No. 12,721, dated April 17, 1855; Reissue No. 707, dated April 26, 1859; Reissue No. 1,971, dated May 23, 1865.

DIVISION E.

*To all whom it may concern:*

Be it known that ELIAKIM B. FORBUSH, of the city of Buffalo, in the county of Erie and State of New York, heretofore invented certain new and useful Improvements in Grain and Grass Harvesting Machines, for which Letters Patent of the United States were duly issued to him on the 19th day of April, 1855, which said Letters Patent were afterward canceled and new Letters Patent issued to him on the 26th day of April, 1859, and such last-mentioned Letters Patent being now deemed to be invalid and inoperative by reason of a defective and insufficient specification; now, therefore, I, CYRENUS WHEELER, Jr., of Poplar Ridge, in the county of Cayuga and State of New York, assignee, by mesne assignments, and owner, of the whole interest, right, and title of said Letters Patent, and of the said invention and improvements, do hereby declare, pursuant to the statutes in such cases made and provided, that the following is a full and exact description of distinct and integral parts of said invention and improvements, reference being had to the accompanying drawings, making a part of this specification, in which—

Figure 1 is a top or plan view of said grain and grass harvesting machine. Fig. 4 is a bottom plan of the finger-bar and cutting apparatus. Fig. 6 is a perspective of the device called a "clamp" for holding the finger-bar and cutting apparatus and for connecting the same to the main frame of the machine, each part thereof also being shown separately. Fig. 10 represents different views of the track-clearer and also the form and construction of the guard-finger.

Letters of like name and kind refer to like parts in each of the figures.

The nature of the said invention and improvements, so far as the same are embraced in the parts or division thereof herein described and claimed, consists, first, in forming a recess in the outside shoe, in rear of the cutters; second, an additional lock or catches formed in the clamp.

The form of the guard-finger is most distinctly shown in the elevation thereof in Fig. 10. The curved or runner part thereof is shown at *l*. The front edge of the finger-bar is made to conform to this curve, and when the guards are all placed thereon they protect the finger-bar from wearing off as it slides over the ground, the guards forming a smooth runner-surface. It will be noticed that in the construction of these guards the slit through which the cutters vibrate is raised just high enough to be in the same plane as the top of the finger-bar when the guard is placed on the finger-bar. Consequently when the grass is cut and falls back onto the finger-bar there is no rise or elevation in the finger-bar to prevent the grass from sliding over the finger-bar easily. In casting the guard the part thereof against which the cutting is done is hardened, which renders the cutting of the grass or grain much easier. This hardening is done by casting guard on a "chill." This renders the surface against which the cutting is done so very hard as prevents it from wearing or rounding off. A sharp edge is always retained to the guard and there is less liability of the fine grass being drawn in without being cut. If a guard of wrought or soft iron is used, the knives are liable to cut the guard and round off the edge, and the cutting becomes less and less perfect and the guard liable to clog; but by making this part of the guard harder than the cutter the cutters will not cut or wear it off, and hence the cutting principle is more perfectly retained. These guards may be cast whole on a chill, or, if preferred, the upper or lower part of the guard may be cast separately on a chill and the other part not, and then the two parts may be rivoted, locked, or otherwise fastened together. A second angle is made in the overhanging or brace part of the guard, as shown at Y, in order more effectually to prevent the guards from clogging up with fine grass, fibrous or gummy matter. When the guards are all placed upon the finger-bar they mutually brace and support each other, and they are also braced against the outer shoe and inner shoe or clamp, all of which is shown in Fig. 1. In constructing the outside shoe, K, a recess, K′, is formed therein behind the cutters, so as more effectually to prevent fine grass and other matter from packing in the shoe, and also for the purpose of making the shoe lighter.

The clamp for holding the finger-bar and cutting apparatus and for connecting the same to the main frame is shown in Fig. 6. It consists of the angle piece S, the perpendicular piece S′, and the shoe-piece $S^2$, and these parts, when put together as shown in Fig. 6, connect with the projecting timbers $A^2$ and $A^3$ of the main frame. Slots $S^3$ are made in the perpendicular portions thereof, through which fastening-bolts pass to admit of its adjustability on the main frame. The surface of the perpendicular part is corrugated and corresponds with a corrugated washer, *r s*, so that the tightening-bolts will hold it in place. The end of the finger-bar is held in the mortise 5 by compression. The upright part of the clamp locks into the shoe or runner part, as seen at Z, so that when the bolts 7 are made fast the finger-bar is held by compression, as in a vise, without bolts passing through the finger-bar. A slight rib, Z′, is raised in the shoe or runner, which rib becomes indented in the finger-bar, so as to prevent it from slipping in case the compression should by any means become too slight to hold it securely. Guide-plates 8 are fixed on the projecting sides of the frame-timbers, having flanges, within which flanges the upright parts of the clamp are placed, which guide the clamp as it is moved up or down, and also prevent the clamp from swaying sidewise. The clamp is so constructed that as it is raised or lowered (and with it the finger-bar and cutters) for mowing or reaping, the same relative distance will be maintained, or nearly so, between the cutters and the crank-shaft at different heights, so that the same connecting-rod will make the proper connection between the cutters and crank-shaft without change in the length of the connecting-rod and without changing the throw of the cutters in the guards.

Having now fully described those parts of the said invention and improvements embraced in this division thereof, so that persons skilled in the art may construct and use the same, what I claim as the invention of the said FORBUSH, and desire to secure by these Letters Patent, is—

1. Forming a recess in the outside shoe, in rear of the cutters, substantially as shown at K′, and for the purposes set forth.

2. The locks or catches Z Z′, formed in the clamp, for the purposes set forth.

In testimony whereof I hereunto subscribe my name in the presence of two witnesses.

C. WHEELER, JR.

Witnesses:

W. H. MEAKER,

WM. ALLEN.